(12) United States Patent
Michalak et al.

(10) Patent No.: US 9,009,029 B1
(45) Date of Patent: Apr. 14, 2015

(54) SEMANTIC HASHING IN ENTITY RESOLUTION

(71) Applicants: Phillip Daniel Michalak, Spring Hill, TN (US); James Johnson Gardner, Nashville, TN (US); Kenneth Loran Graham, Nashville, TN (US)

(72) Inventors: Phillip Daniel Michalak, Spring Hill, TN (US); James Johnson Gardner, Nashville, TN (US); Kenneth Loran Graham, Nashville, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 227 days.

(21) Appl. No.: 13/732,061

(22) Filed: Dec. 31, 2012

Related U.S. Application Data (63) Continuation-in-part of application No. 13/666,722, filed on Nov. 1, 2012, now Pat. No. 8,457,950.

(51) Int. Cl.
*G10L 15/00* (2013.01)
*G06F 17/28* (2006.01)

(52) U.S. Cl.
CPC ..................................... *G06F 17/28* (2013.01)

(58) Field of Classification Search
USPC ........................... 704/9, 10; 707/755; 715/256
See application file for complete search history.

(56) References Cited

U.S. PATENT DOCUMENTS

| | | | |
|---|---|---|---|
| 7,249,117 B2 | 7/2007 | Estes | |
| 7,882,055 B2 | 2/2011 | Estes | |
| 8,015,143 B2 | 9/2011 | Estes | |
| 8,219,588 B2 * | 7/2012 | Bousquet et al. | 707/791 |
| 8,285,725 B2 | 10/2012 | Bayliss | |
| 8,290,968 B2 | 10/2012 | Jonas | |
| 8,370,355 B2 | 2/2013 | Harger et al. | |
| 8,423,525 B2 | 4/2013 | Jonas | |
| 8,510,323 B2 | 8/2013 | Eshwar et al. | |
| 2006/0253476 A1 * | 11/2006 | Roth et al. | 707/100 |
| 2007/0185868 A1 * | 8/2007 | Roth et al. | 707/6 |
| 2012/0215808 A1 | 8/2012 | Allen et al. | |
| 2013/0006641 A1 * | 1/2013 | Brown et al. | 704/270.1 |
| 2013/0041652 A1 * | 2/2013 | Zuev et al. | 704/8 |
| 2014/0303963 A1 * | 10/2014 | Womack et al. | 704/9 |

OTHER PUBLICATIONS

Understanding Alice: Synthesys Model Training, Aug. 2012, Digital Reasoning Systems, Inc. 12 pages.

* cited by examiner

*Primary Examiner* — Daniel D Abebe
(74) *Attorney, Agent, or Firm* — Troutman Sanders LLP; Ryan A. Schneider; Christopher W. Glass (57) ABSTRACT

According to one aspect, a computer-implemented method for entity resolution is disclosed. In one embodiment, the method includes generating a semantic hash for an entity having an assigned entity identifier (ID) and, upon the occurrence of an entity milestone, changing the entity ID. The method further includes generating a semantic hash for the entity having the changed entity ID, and maintaining history information associated with the entity and corresponding entity IDs and semantic hashes over a period of time that includes a plurality of entity milestones. The method also includes periodically removing at least one set of older entities and retaining entity IDs and semantic hashes associated with the removed entities.

20 Claims, 9 Drawing Sheets

SEMANTIC HASHING IN ENTITY RESOLUTION

CROSS-REFERENCE TO RELATED PATENT APPLICATION

This application is a continuation-in-part of, and claims benefit of U.S. patent application Ser. No. 13/666,722, filed Nov. 1, 2012 entitled "System and Method for Coreference Resolution," by Phillip Michalak, Kenneth Graham, and James Gardner, now U.S. Pat. No. 8,457,950, the disclosure of which is hereby incorporated by reference herein in its entirety.

BACKGROUND

Entity resolution can generally be defined as a process of determining whether two expressions (or "mentions") in natural language text refer to the same entity. Given a collection of mentions of entities extracted from a body of text, mentions may be grouped such that two mentions belong to the same group ("cluster") if they refer to the same entity. It may be recognized that an entity is coreferent with and refers to the same entity or that information associated with the entity is referring to multiple distinct real-world individuals. Because the number of mentions and entities present within text of a document or across multiple documents can reach into the thousands or more, conventional approaches to entity resolution can be computationally demanding and thereby time consuming, particularly at large scale. It is with respect to these and other considerations that the various embodiments described below are presented.

SUMMARY

According to one aspect, a computer-implemented method is disclosed. In one embodiment, the method includes generating a semantic hash for an entity having an assigned entity ID. The method further includes changing the entity ID upon the occurrence of an entity milestone, and generating a semantic hash for the entity having the changed entity ID. The method also includes maintaining history information for entity IDs and semantic hashes associated with the entity over a period of time that includes a plurality of entity milestones. The method further includes periodically removing one or more sets of older entities and retaining entity IDs and semantic hashes associated with the removed entities.

The entity milestone can correspond to a merge of a plurality of entities corresponding to the same real-world individual, a split of an entity corresponding to multiple real-world individuals, or removal of entities from a coreference set. Each of the semantic hashes can include high confidence information associated with attributes of the at least one entity. The high confidence information can include one or more of biographical information, distribution information associated with mention text, co-location information, assertion information, and temporal information.

In one embodiment, the method also includes maintaining a search structure for performing an entity similarity search across the semantic hashes. The search structure can be configured to enable a nearest neighbor search to be performed across semantic hashes associated with the entity IDs.

According to another aspect, a computing system is disclosed. In one embodiment, the system includes a processing unit and a memory operatively coupled to the processing unit. The system also includes a program module that executes in the processing unit from the memory and which, when executed by the processing unit, causes a computer to perform specific functions. In one embodiment, the functions include generating a semantic hash for at least one entity having at least one respective entity ID. The functions further include changing the at least one entity ID upon the occurrence of an entity milestone and generating a semantic hash for the entity having the respective at least one changed entity ID. The functions also include maintaining history information for entity IDs and semantic hashes associated with the at least one entity over a period of time that includes a plurality of entity milestones. The functions further include periodically removing one or more sets of older entities and retaining the respective entity Ms and semantic hashes.

The entity milestone can include one or more of a merge of a plurality of entities into a single entity corresponding to the same real-world individual, a split of an entity into a plurality of entities corresponding to multiple real-world individuals, and removal of entities from a coreference set. Each of the semantic hashes can include high confidence information associated with attributes of the entity. The high confidence information can include one or more of biographical information, distribution information associated with mention text, co-location information, assertion information, and temporal information.

In one embodiment, the functions also include maintaining a search structure for performing an entity similarity search across the semantic hashes. The search structure can be configured to enable a nearest neighbor search to be performed across semantic hashes associated with the entity IDs.

According to another aspect, a computer-readable storage medium is disclosed. The computer-readable storage medium has stored, computer-executable instructions which, when executed by a computer, cause the computer to perform specific functions. In one embodiment, the functions include generating a semantic hash for at least one entity having at least one respective entity ID. The functions further include changing the at least one entity ID upon the occurrence of an entity milestone, and generating a semantic hash for the entity having the respective at least one changed entity ID. The functions also include maintaining history information for entity IDs and semantic hashes associated with the at least one entity over a period of time that includes a plurality of entity milestones. The functions further include periodically removing one or more sets of older entities and retaining the respective entity IDs and semantic hashes.

The entity milestone can include one or more of a merge of a plurality of entities into a single entity corresponding to the same real-world individual, a split of an entity into a plurality of entities corresponding to multiple real-world individuals, and removal of entities from a coreference set. Each of the semantic hashes can include high confidence information associated with attributes of the entity. The high confidence information can include one or more of biographical information, distribution information associated with mention text, co-location information, assertion information, and temporal information.

In one embodiment, the functions also include maintaining a search structure for performing an entity similarity search across the semantic hashes. The search structure can be configured to enable a nearest neighbor search to be performed across semantic hashes associated with the entity IDs.

These and other features as well as advantages will be apparent from a reading of the following detailed description and a review of the associated drawings.

DETAILED DESCRIPTION

Some references, which include various publications are discussed in the disclosure provided herein. The citation and/or discussion of such references is provided merely to clarify the description of the present disclosure and is not an admission that any such reference is "prior art" to any aspects of the present disclosure described herein. In the following detailed description, references are made to the accompanying drawings that form a part hereof, and in which are shown by way of illustration specific embodiments or examples.

According to embodiments described herein, each entity in an entity resolution system can be characterized using a semantic hash representation of high confidence information for entity disambiguation. As used herein, "semantic hash" can refer to a compact representation of the content of an entity at a specific point in time. Those skilled in the art will recognize that various techniques exist for computing semantic hashes, for example as described in "Semantic Hashing," by R. Salakhutdinov and G. Hinton, and "Near-Optimal Hashing Algorithms for Approximate Nearest Neighbor in High Dimensions," by A. Andoni and P. Indyk.

Similarity comparisons between the semantic hashes can be performed in a manner that is less time consuming than comparisons performed according to more extensive logical similarity comparisons. Rather than computing similarity along thousands of dimensions or aspects, and in ways that can be logically complex, by using semantic hash representations as compact signatures according to embodiments described herein, similarity can be computed along far fewer dimensions. For example, according to one embodiment, dimensions in reduced signatures can be single on/off bits.

The life cycle of an entity can include one or more major events, referred to herein as "entity milestones," For example, it may be recognized that the entity is coreferent with another entity or that the information contained in the entity is referring to multiple distinct real-world individuals. At such entity milestones, an entity identifier (ID) associated with the entity can be changed. An entity ID can refer to a system-generated universally unique identifier (UUID) for an entity. It can be expedient to change an entity ID at an entity milestone in order to explicitly identify within the system that the entity has changed in a substantial way to provide for entity ID tracking functions, such as tracing entity IDs over time. Changing the entity ID can also signify the change to external consumers of the system output.

Some examples of entity milestones are: a merge of two entities because the two entities both refer to the same real-world individual; a split of a single entity because it refers to multiple, distinct real-world individuals; and a significant change in a semantic hash representation of the entity because enough mentions have been removed from the entity coreference set. The semantic hash can comprise high confidence information associated with attributes of the entity, which can include biographical information, distribution information associated with mention text, co-location information, assertion information, and temporal information.

As will be described in further detail below, a semantic hash can allow for nearest neighbor searches to other entities. The semantic hash can include distribution information about mention text and co-locations. According to one embodiment, when an entity resolution system recognizes that an entity milestone has occurred, for example a merge or split, the entity IDs of the one or more changing entities can be correlated with the new entity IDs that result from the split or the entity absorbing the merged entity. The entity ID correlations over time can be maintained, for example by keeping a history of the entity IDs before and after an entity has undergone a change and receives a changed entity ID, over a period of time with many entity milestones. An entity ID may be referred to as "retired" when the ID is no longer traceable to a currently maintained entity. As will be described in further detail below, the ID history information can be maintained such that third party applications using the entity Ms can still retrieve the concepts corresponding to the ID, which may be a retired ID.

According to one embodiment, the history information can be compressed based on a notion of entity similarity search. A semantic hash for an entity, which can be considered a compact signature for the entity at a specific point in time, is associated with each entity ID. A mapping is maintained for every entity ID ever assigned by an entity resolution system with its correlated semantic hashes. Also, a search structure for k-nearest search among semantic hashes is maintained. Those skilled in the art will recognize that k-nearest operations (e.g. "k-nearest neighbor") generally relate to methods for classifying objects based on closest training examples in the feature space. An object can be assigned to the class most common amongst its k nearest neighbors (wherein k is an integer). A mapping of entity IDs to correlated entities is maintained, for active entity IDs, i.e. entity IDs that have not been replaced by a new ID as part of a merge or split operation. In addition, the entity ID history information is maintained as described above.

According to one embodiment, based on information obtained and maintained according to the embodiment described above, the history information can be compressed by removing the history information for the oldest generations of entity IDs. Although the removal of an ID X during a compression operation may remove the capability to retrieve the set of entities known to have derived from the entity referred to by X, because a persistent mapping of entity IDs to correlated semantic hashes has been maintained, the hash signature for ID X can be Obtained, and then a nearest neighbor search can be performed to retrieve "similar" entities that currently exist in the system. This approximate entity lookup from a retired ID allows periodic history compression and therefore can provide for storage space savings.

Referring now to the drawings, in which like numerals represent like elements throughout the several figures, aspects of the various implementations provided herein and exemplary operating environments will be described.

Figure 1:
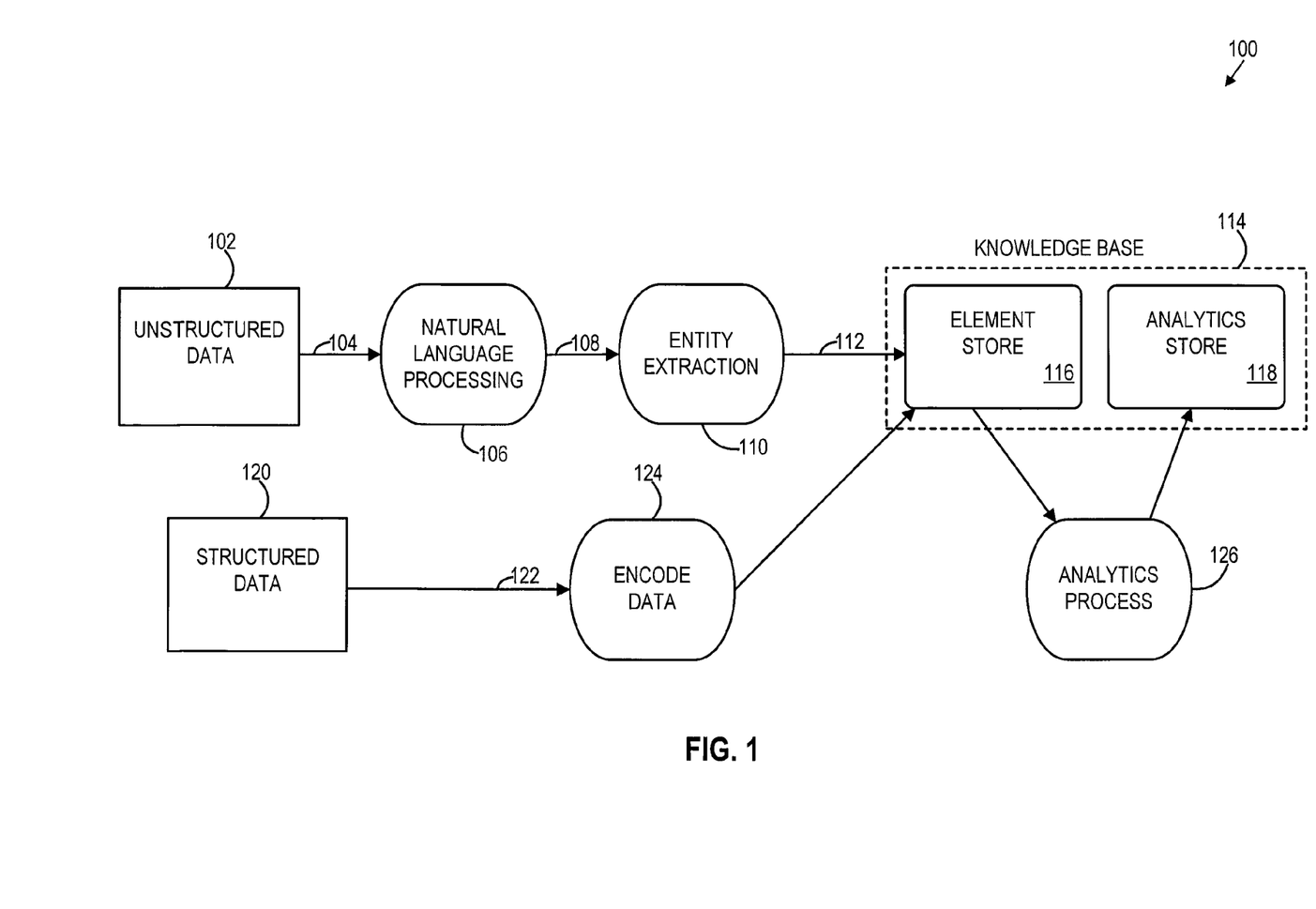
FIG. 1 is a diagram illustrating software architecture of a data processing system in which one or more embodiments described herein may be implemented.
Figure 6:
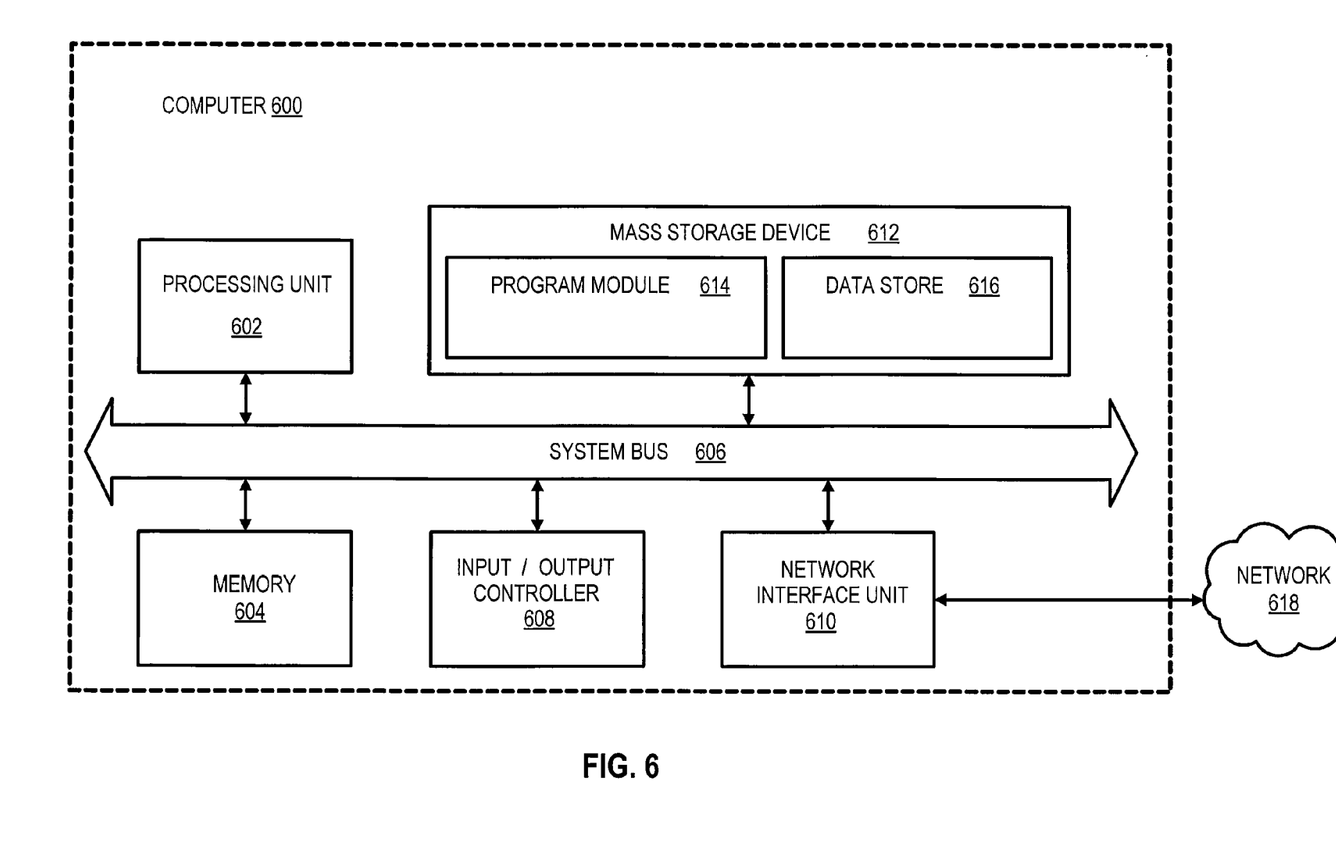
FIG. 6 is a computer architecture diagram illustrating computer hardware architecture for a computing system capable of implementing one or more embodiments presented herein.

FIGS. 1 and 6, and the corresponding discussions, are intended to provide a brief, general description of a suitable computing environment in which one or more embodiments described herein may be implemented. While the subject matter described herein is presented in the general context of program modules that execute in conjunction with the execution of application modules on a computer system, those skilled in the art will recognize that other implementations may be performed in combination with other types of program modules. Generally, program modules include routines; programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 1 is a software architecture diagram for a data processing system 100 in which one or more embodiments described herein may be implemented. The system 100 includes an entity storage architecture, referred to herein as a "knowledge base" 114, which is configured to perform at scale for both data insertion and querying. The knowledge base 114 can provide the flexibility of a pluggable-type modular architecture to accommodate a variety of analytics and natural language processing ("NLP") engines. It can have combined persistent storage and intelligent data caching to allow for rapid storage and retrieval of text documents and related metadata, which may include text content of messages, categorized individual tokens and semantic token groups including those messages, and meta data such as properties, relationships, and events. As shown, the knowledge base 114 includes an element store 116 and an analytics store 118.

Structured input data 120 and unstructured input data 102 ingested according to functions performed by the data processing system 100 can be stored in the knowledge base 114. Structured data 120 may be stored in the knowledge base 114 directly in an encoded form, while the unstructured data 102 may undergo more extensive processing. Unstructured data 102 may be accepted in a UTF-8 text format 104, and structured data 120 may be accepted in a specified XML format 122, among other commonly used data formats.

The system 100 is configured to perform specific analytics functions as data is ingested and stored in the knowledge base 114, namely NLP, entity extraction processes, and various advanced analytics processes. NLP and entity extraction may be performed according to a statistical model approach, which can provide for high-quality feature identification without requiring labor-intensive rule tuning efforts. Statistical models can be easier to train and they can be easily adapted to a variety of genres of data. A first step in the unstructured ingestion process is to "tokenize" an input stream of text 104 into "terms" for NLP, shown at reference numeral 106. A term can be a word, punctuation mark, or special character. Each term is then examined in order to determine its role (entity, predicate, number, punctuation, etc.). Next, each term is assigned a part of speech ("POS"), such as proper noun, adjective, adverb, etc. Subsequently, the role and POS information is used to determine if any adjacent terms should be co-joined into a single "element." As an example, "John" and "Smith" may be co-joined into a single element "John Smith." This process can be referred to as "lemmatization" or "chunking." The output 108 includes elements tagged according to an assigned role. In some contexts, elements may also be referred to as entities. Elements may be treated as the smallest unit of data that is categorized and processed to determine relationships across a corpus of data.

The next step in the data ingestion process performed by system 100 is categorization of the role-tagged elements produced by the NLP, shown at reference numeral 110. This may be referred to as entity (or element) extraction. Each element can be examined to determine if it should be classified as belonging to one of the categories defined by the statistical classification process. Predefined categories may be used, and additional categories may be created by marking up training files with representative examples of the elements of new categories.

Category-tagged elements 112 result from the entity extraction stage 110. At this stage of the data ingestion process, the knowledge base 114 contains the ingested files in an encoded format, where each element is tagged with role and category information. The element data store 116 contains the tables that define the input messages, the contexts making up each message, and the elements making up each context. Various analytic processes 126 can be run on the ingested data to find relationships and to resolve entities. Entity resolution generally refers to a process of rolling up all the mentions that refer to the same real-world entity into a global representation of that entity.

Structured input data 120 may be ingested in XML format, shown by data stream 122, and may be encoded (shown at reference numeral 124) before being stored in the knowledge base 114. Structured input data 120 can be defined by an XML file and can take the form of concepts, properties, events, and/or relationships. A concept may describe an entity, for example a person, place, or thing, through associated properties. For instance, when describing a person, associated properties of a concept may be height, weight, eye color, hair color, or bank account number. Properties may be expressed as "name:value" pairs describing attributes that can be associated with any element or entity defined in the system, for example, "weight:215," whether structured or unstructured. Properties can also be used to augment other analytics processes such as entity resolution, and may further be used to track data back to its source using a pedigree value.

Relationship data may include a name of the relationship and a list of two or more entities and/or events that share that relationship. For example, a relationship might be "classmates," containing a list of people, that is, entities that share the relationship. Entities can be related to events or other entities, and events can be related to entities or other events. Events, also referred to herein as "temporal features" or "time features," may be defined as activities with a temporal component. A variety of methods can be used for specifying time and location, including specific time specifications with a start/end value, or a more fuzzy specification, such as "Spring." As used herein, "space" features relate to geographic locations ("geolocations") that may be specified by latitude/longitude coordinates or the name of a location. Some functions of language processing according to embodiments described herein can be implemented using probabilistic mathematical models (i.e. model-based machine learning). These mathematical models can encode a variety of different data features and associated weight information, which is stored in a network-based file system and can be used to re-construct a model at run time.

Using generated assertions over entities (e.g. <Assertion: Subject, Predicate, Object>), feature descriptors may be created (e.g. <Subject, Predicate>, <Object, Predicate>) appropriately for those entities. The similarity metric of two textual mentions may be improved using pair-wise correlations of entities that frequently occur in the assertions. Using geolocation labels on the entities, feature descriptors can be created which have a contextual relation with a given entity at both sentence level and the document level. Two mentions with the same name but referring to distinct elements can have a lesser likelihood of sharing the same geographic locations than the same two mentions that refer to the same element. Using temporal labels on the entities, feature descriptors can be created which have a contextual relation with a given entity at both a sentence level and document level. Two mentions with the same name but referring to distinct elements can have a lesser likelihood of sharing the same time characteristics than the same two mentions that refer to the same element. These values may be stored in the data as properties belonging to the element representing the named location and/or time.

A graph, for example as described in "FACTORIE: Probabilistic Programming via Imperatively Defined Factor Graphs," by A. McCallum, K. Schultz, and S. Singh ("McCallum et al."), may be initialized using the generated associations over mentions, leading to a faster and improved convergence. Computations of a similarity metric may be improved by utilizing available temporal features and geolocation features. Entities that have occurrences during the same time period and also the same geographical location may have a high similarity.

According to embodiments described herein, a mention supports having contextual and non-contextual feature vectors to generate the similarity metric. A feature vector may be defined as an n-dimensional vector of numerical features that represent some element (or mention). Non-contextual features can be considered as those features which are constant for a given word regardless of the context. Non-contextual features may comprise tokenizer output and features at the character level for a given word, as opposed to a widely known word level in each sentence. Contextual features may comprise extractor tags and features at the word level in the sentence. Space and time may be maintained as additional features, having particular significance where a mention has either a geolocation or temporal label set. Based on the token information of a contextual feature vector, it can be inferred if a particular term has an extractor tag, and based on tokens of space and time feature vectors, it can be inferred if the particular term is a location entity or a time entity. For each mention, two lists can be maintained to include specific dependencies. Each mention may have a list of all the space entities and also another list of all the time entities that occurred in a corresponding sentence. Accordingly, when a sub-entity is created, feature sets can be maintained for space and time, which contain the unique space and time entities that its mentions have dependencies on.

With reference to FIGS. 2-4, 7, and 8, illustrative routines associated with implementation of operations for performing various methods according to some embodiments will be described in detail. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the Figures and described herein. These operations may also be performed in a different order than those described herein.

Figure 2:
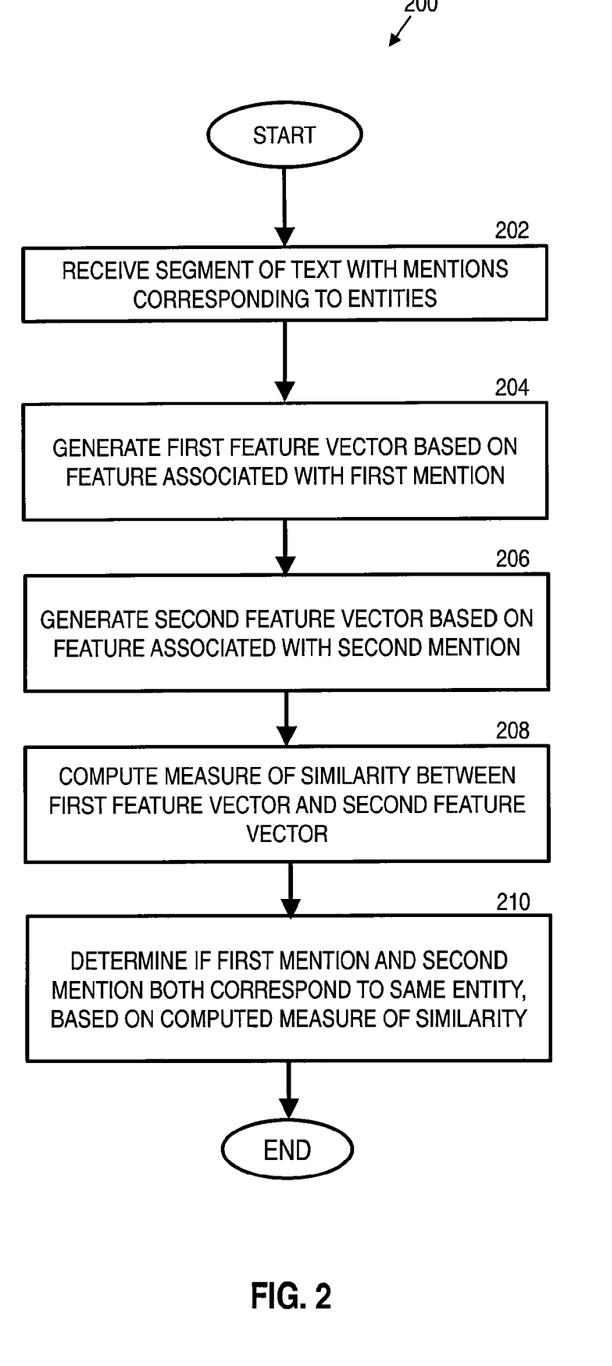
FIG. 2 is a flow diagram illustrating operations of a method for coreference resolution according to one embodiment.

Referring now to FIG. 2, operations of an illustrative method 200 for coreference resolution according to one embodiment will be described in detail. The method 200 begins at operation 202, where a segment of text is received. The segment of text includes one or more mentions that correspond to entities. The entities may correspond to person entities, temporal entities, organization entities, and/or location entities. The method 200 proceeds from operation 202 to operation 204, where a first feature vector is generated based on features associated with a first one of the mentions. Next, at operation 206, a second feature vector is generated based on features associated with a second one of the mentions. One or more of the features associated with the first one of the mentions and the second one of the mentions may have an assigned weight that is higher or lower than an assigned weight of one or more of the other features. A Maximum Likelihood Estimation ("MLE") approach may be utilized to assign weights.

The features may include contextual features, non-contextual features, temporal features, and/or location features. The contextual features may include assertions, associations, and/or assigned roles. Assertions may be defined as subject-predicate-object relations. Associations can relate to aggregating mentions according to their text and role (e.g. entity, predicate, number, punctuation) to form clusters of mentions. Associations may include "same-sentence" or "same-document" relationship information. The non-contextual features may include parts of speech, titles, first characters, next characters, prefixes, and/or suffixes.

From operation 206, the method 200 proceeds to operation 208, where a measure of similarity is computed between the first feature vector and the second feature vector. The measure of similarity can represent a degree or amount by which the first one of the mentions and the second one of the mentions correspond to the same entity. The similarity metric may be computed by using a weighted sum of the individual similarities of space feature vectors, time feature vectors, contextual feature vectors, and non-contextual feature vectors. Factor graphs and pairwise factor modeling, for example as described in "Large-Scale Cross-Document Coreference Using Distributed Inference and Hierarchical Models," by S. Singh, A. Subramanya, F. Pereira, and A. McCallum ("Singh et al."), may be used in computing the similarity metric, which involves capturing similarity between all pairs of mentions using cosine similarity of mention context pairs. Those skilled in the art will recognize that many other techniques are also available to be used for calculating similarity metrics.

Figure 5:
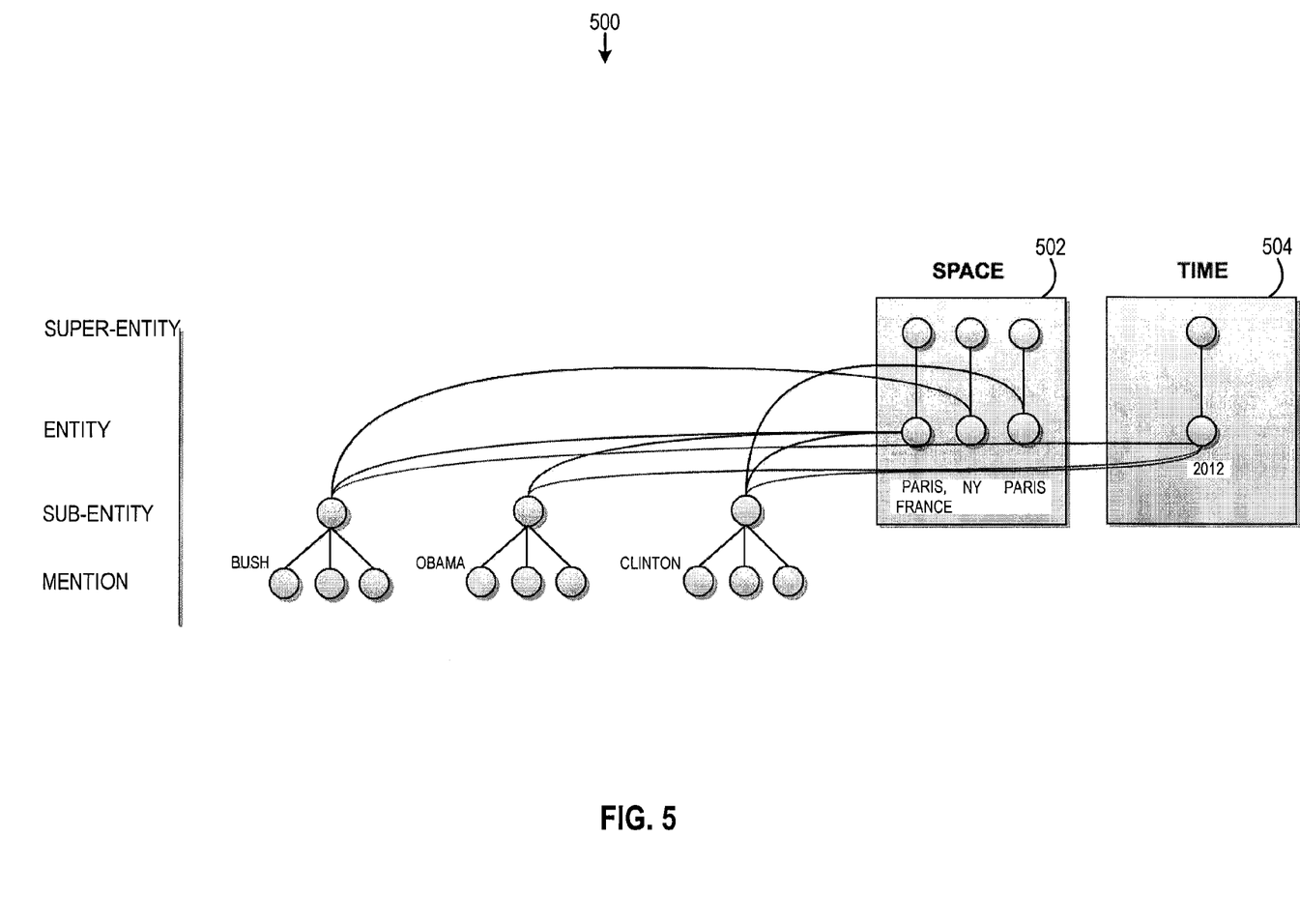
FIG. 5 is a diagram illustrating an exemplary application of coreference resolution technologies presented herein according to one or more embodiments.

Each of the entities may be associated with a level of a hierarchical structure that defines a plurality of entity levels, and the measure of similarity may be computed by dynamically organizing mentions based on the hierarchical structure. An exemplary hierarchical structure which may be utilized is described in Singh et al., in which "sub-entity" variables represent clusters of similar mentions that are likely to be coreferent, which are then used to propose composite jumps that move multiple mentions together, and wherein "super-entity" variables represent clusters of similar entities. An exemplary embodiment of dynamic organization based on a hierarchical structure of entity levels is shown in FIG. 5.

Figure 3:
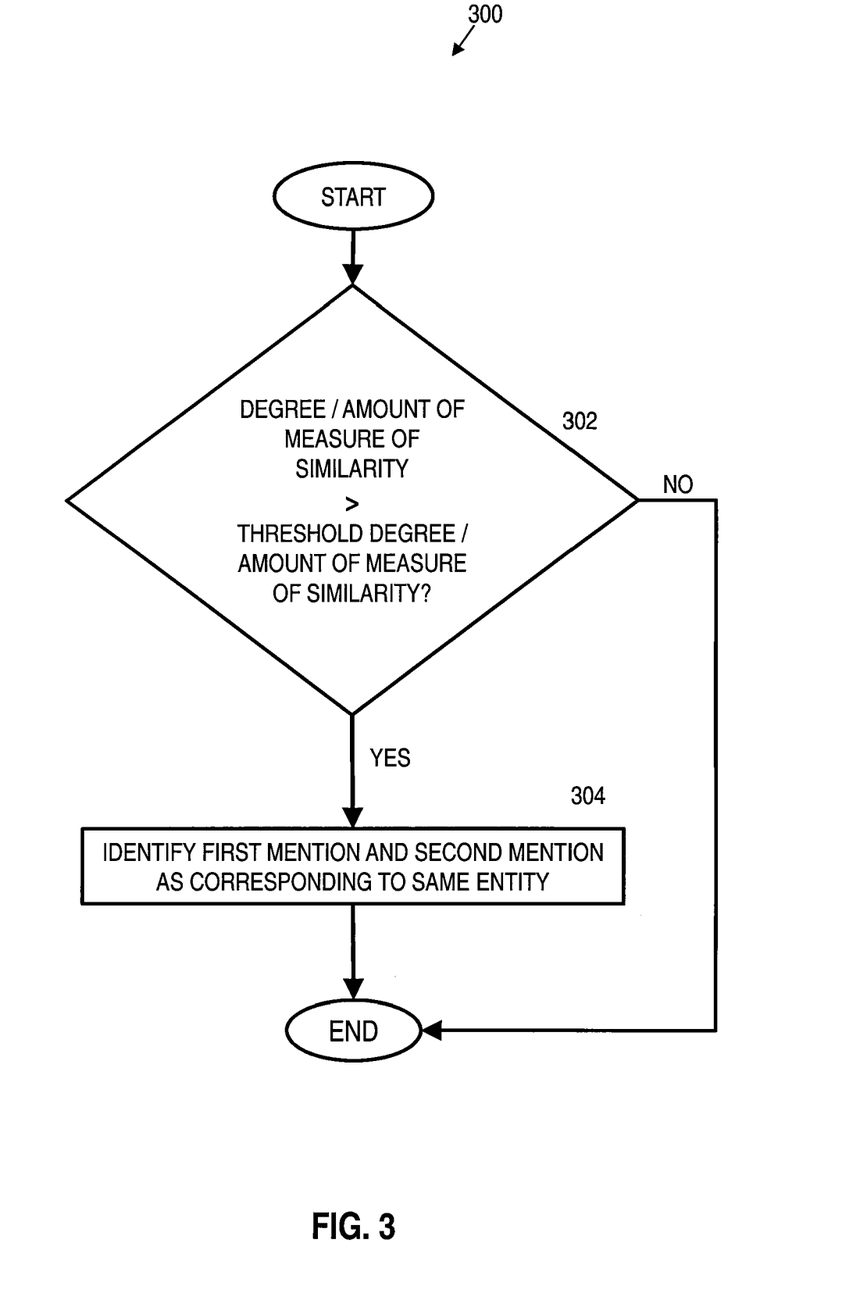
FIG. 3 is flow diagram illustrating operations of a method for determining feature vector similarity according to one embodiment.

The method 200 proceeds from operation 208 to operation 210, where it is determined whether the first one of the mentions and the second one of the mentions both correspond to the same entity. The determination is made based on the computed measure of similarity between the first feature vector and the second feature vector. The determination may be performed by dynamically organizing mentions based on the hierarchical structure. The dynamic organization may include aggregating mentions upwards from a lower level of the hierarchical structure to a higher level of the hierarchical structure. Dynamic organization may include the use of one or more dimension reduction techniques, including semantic hashing. Semantic hashing may generally be defined as a dimensional reduction method in which hash functions are used to map a feature vector existing in a high-dimensional vector space to a vector that exists in a space of lower dimension. The mapping is defined such that feature vectors similar in the original space are mapped with high probability to vectors similar in the hash space. The determination may additionally or alternatively be performed according to a threshold-type comparison as illustrated in FIG. 3. Following operation 210, the method 200 ends.

Now referring to FIG. 3, operations of an illustrative method 300 for determining whether a first mention and a second mention both correspond to the same entity, according to one embodiment, will be described. The method 300 begins at operation 302, where a measure of similarity between a first feature vector and a second feature vector is computed and compared to a threshold degree or amount of similarity. The measure of similarity represents a degree or amount by which the first mention and the second mention both correspond to the same entity. The threshold degree or amount may be set to a level of confidence that is acceptable, such as a value for a degree or amount of similarity above which there is high confidence that the first mention and the second mention correspond to the same entity. If the computed measure of similarity exceeds the threshold amount or degree, the method 300 proceeds from operation 302 to operation 304, where the first mention and the second mention are identified as corresponding to the same entity. Following operation 304, the method 300 ends. If it is determined at operation 302 that the computed measure of similarity does not exceed the threshold amount or degree, the method 300 ends.

Figure 4:
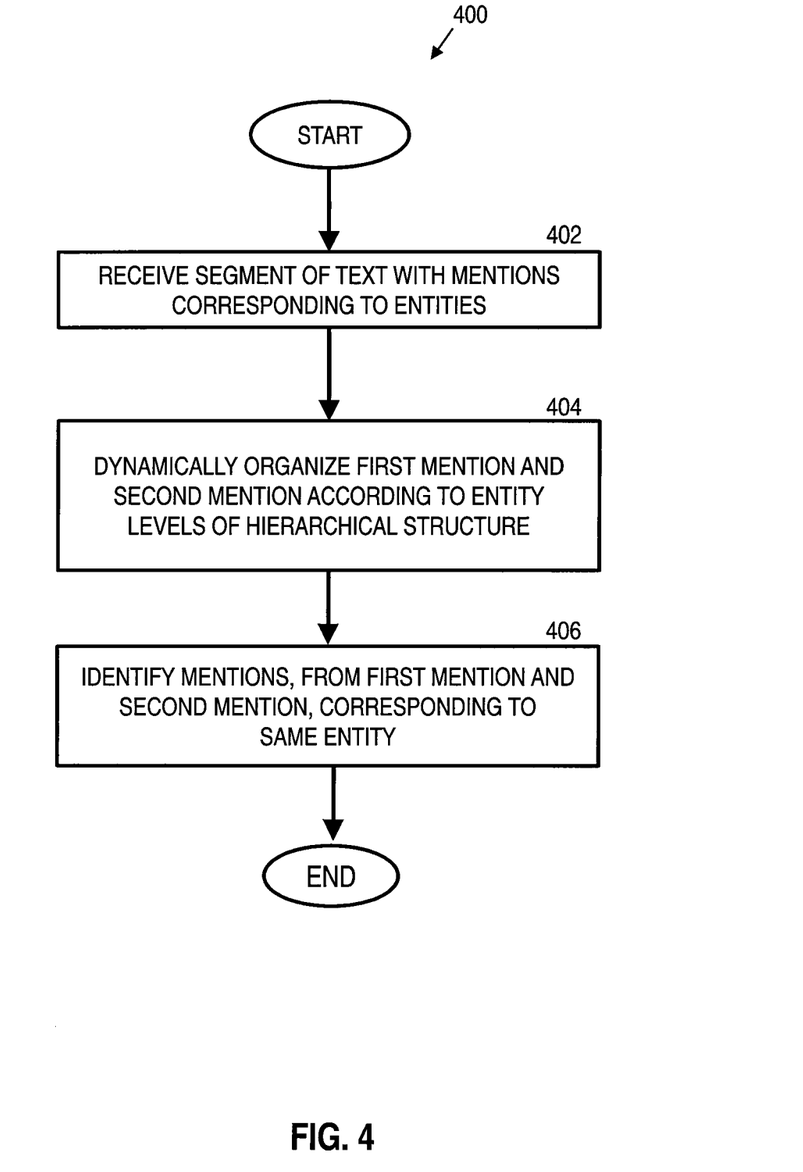
FIG. 4 is a flow diagram illustrating operations of a method for coreference resolution according to another embodiment.

Referring now to FIG. 4, operations of an illustrative method 400 for coreference resolution according to one embodiment will be described in detail. The method 400 begins at operation 402, where a segment of text is received. The segment of text includes one or more mentions that correspond to entities. The entities may correspond to person entities, temporal entities, organization entities, and/or location entities. One or more of the features associated with first mentions and/or second mentions may have an assigned weight that is higher or lower than an assigned weight of one or more of the other features. The features may include contextual features, non-contextual features, temporal features, and/or location features. The contextual features may include assertions, associations, and/or assigned roles. The non-contextual features may include parts of speech, titles, first characters, next characters, prefixes, and/or suffixes.

From operation 402, the method 400 proceeds to operation 404, where one or more first mentions and one or more second mentions are dynamically organized based on a hierarchical structure defining entity levels. As described above with reference to FIG. 2, dynamic organization may be performed according to a dimensional reduction technique, which may use semantic hashing and may include aggregating mentions upwards from a lower level of the hierarchical structure to a higher level of the hierarchical structure. From operation 404, the method 400 proceeds to operation 404, where one or more of the first mentions and second mentions that correspond to the same entity are identified. Following operation 404, the method 400 ends.

Referring now to FIG. 5, an exemplary implementation of coreference resolution according to one or more embodiments will be described in detail. As shown, a hierarchical structured model 500 has four entity levels: a super-entity level, entity level, sub-entity level, and mention level.

The following exemplary implementation is based on a sample of three sentences: Bush, Obama and Clinton attended the 2012 peace conference in Paris, France. While in conference, Bush got a call and left for NY. Meanwhile, Clinton enjoyed his Paris stay. Within these three sentences, there are five occurrences of person entities, namely the United States presidents (George Bush, Barack Obama, and Bill Clinton), and three occurrences of location entities, namely NY (New York), Paris, and Paris, France. There is also one time entity, namely 2012. The dependencies among these entities can be expressed at the sentence level, where each of the person entities has a dependency on both the location entity and time entity occurring in the sentence. There are three location dependencies in the first sentence, which are: Paris, France and Bush; Paris, France and Obama; and Paris, France and Clinton. Similarly, there are three time dependencies between 2012 and the three U.S. presidents. As shown, the first sentence and third sentence each has an occurrence of Clinton. The likelihood that both of these occurrences of Clinton refer to U.S. president Bill Clinton can be predicted by utilizing the location dependency Paris from both of the sentences.

For the "Clinton" sub-entity, the "Space" feature set 502 contains: 1) "Paris, France"; and 2) "Paris," and the "Time" feature set 504 contains "2012." For the "Bush" sub-entity, the "Space" feature set 502 contains: 1) "Paris, France"; and 2) "NY," and the "Time" feature set 504 contains "2012." Accordingly, a similarity comparison for any given two sub-entities can be dependent on how similar the individual contextual, non-contextual, space and time feature vectors. It should be appreciated that the same logic could be applied to determine that Paris and Paris, France are essentially the same.

FIG. 6 is a computer architecture diagram showing illustrative computer hardware architecture for a computing system capable of implementing embodiments presented herein. As an exemplary implementation, a computer 600 may include one or more of the functional components shown in FIG. 1 and/or be configured to perform one or more functions associated with embodiments illustrated in FIGS. 2-9. The computer 600 includes a processing unit 602, a system memory 604, and a system bus 606 that couples the memory 604 to the processing unit 602. The computer 600 further includes a mass storage device 612 for storing program modules. The program module 614 may include modules for the natural language processing 106, entity extraction 110, data encoding 124, and/or analytics processes 126 described with reference to FIG. 1.

The mass storage device 612 further includes a data store 616, which may include the element store 116 and/or analytics store 118 shown in FIG. 1, and can store history information associated with entities, entity identifiers (IDs) and/or semantic hashes as described below with reference to embodiments illustrated in FIGS. 7-9. The mass storage device 612 is connected to the processing unit 602 through a mass storage controller (not shown) connected to the bus 606. The mass storage device 612 and its associated computer storage media provide non-volatile storage for the computer 600. Although the description of computer-readable storage media contained herein refers to a mass storage device, such as a hard disk or CD-ROM drive, it should be appreciated by those skilled in the art that computer-readable storage media can be any available computer storage media that can be accessed and read by the computer 600.

By way of example, and not limitation, computer-readable storage media may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600. Computer-readable storage media as described herein does not include transitory signals.

According to various embodiments, the computer 600 may operate in a networked environment using logical connections to remote computers through a network 618. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices. The bus 606 may enable the processing unit 602 to read code and/or data to/from the mass storage device 612 or other computer-storage media. The computer-storage media may represent apparatus in the form of storage elements that are implemented using any suitable technology, including but not limited to semiconductors, magnetic materials, optics, or the like.

The program module 614 may include software instructions that, when loaded into the processing unit 602 and executed, cause the computer 600 to provide functions relating to coreference resolution and/or semantic hashing in entity resolution. The program module 614 may also provide various tools or techniques by which the computer 600 may participate within the overall systems or operating environments using the components, flows, and data structures discussed throughout this description. In general, the program module 614 may, when loaded into the processing unit 602 and executed, transform the processing unit 602 and the overall computer 600 from a general-purpose computing system into a special-purpose computing system. The processing unit 602 may be constructed from any number of transistors or other discrete circuit elements, which may individually or collectively assume any number of states. More specifically, the processing unit 602 may operate as a finite-state machine, in response to executable instructions contained within the program module 614. These computer-executable instructions may transform the processing unit 602 by specifying how the processing unit 602 transitions between states, thereby transforming the transistors or other discrete hardware elements constituting the processing unit 602.

Encoding the program module 614 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program module 614 may transform the physical state of the semiconductor memory, when the software is encoded therein. For example, the program modules 614 may transform the state of transistors, capacitors, or other discrete circuit elements constituting the semiconductor memory.

As another example, the computer-storage media may be implemented using magnetic or optical technology. In such implementations, the program modules 614 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

Figure 7:
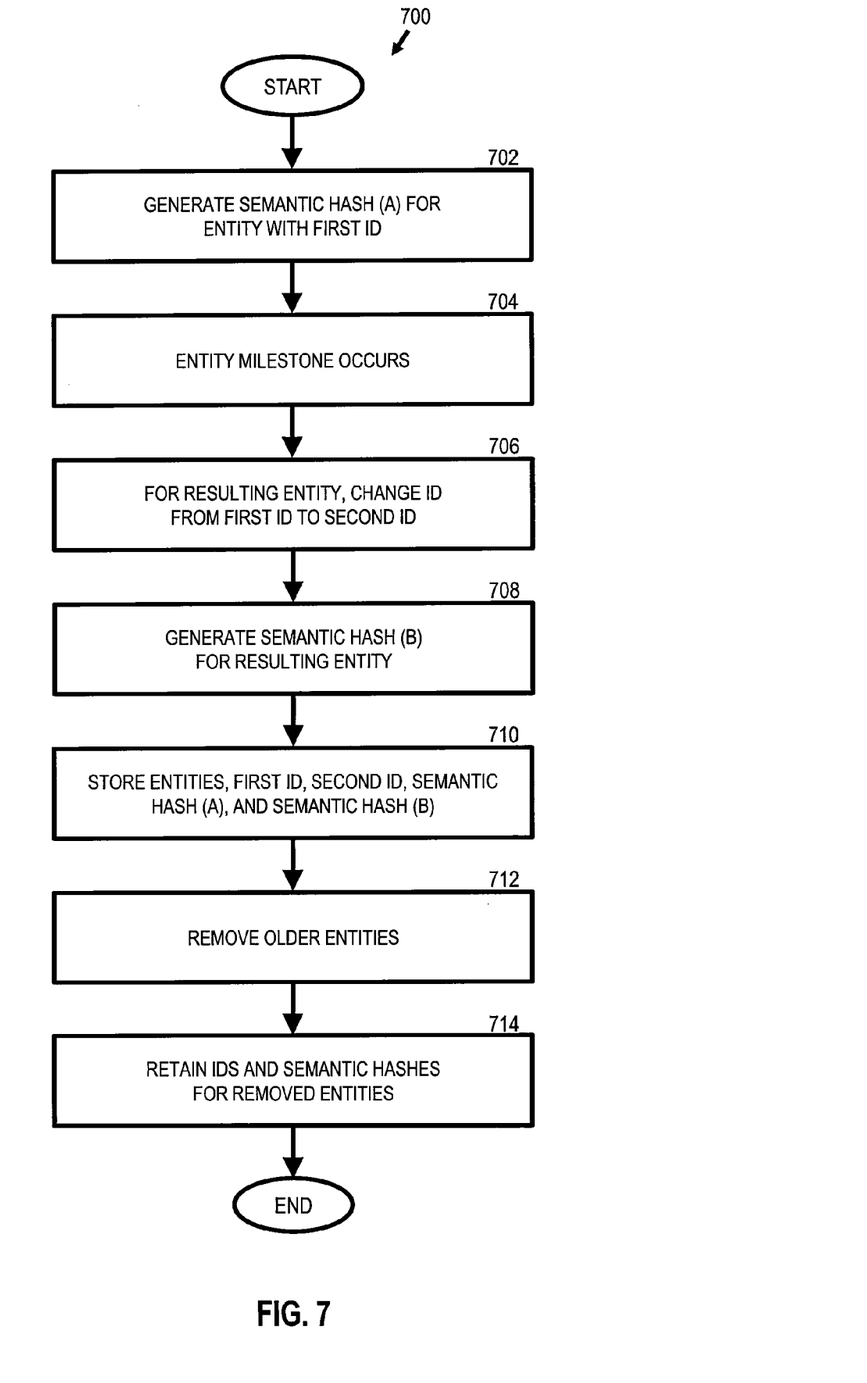
FIG. 7 is a flow diagram illustrating aspects of semantic hashing in entity resolution according to one embodiment.

FIG. 7 is a flow diagram of operations of a method 700 illustrating aspects of semantic hashing in entity resolution, according to one embodiment. The method 700 begins at operation 702, where a semantic hash (A) is generated for an entity having a first entity ID. Upon the occurrence of an entity milestone (704), the entity ID is changed from the first entity ID to a second entity ID, at operation 706. At operation 708, a semantic hash (B) is generated for the entity having the second entity ID, i.e. the entity resulting from the occurrence of the entity milestone. As shown at operation 710, the entities and correlated first ID, second ID, semantic hash (A), and semantic hash (B) are stored. At operation 712, one or more sets of older entities are removed, i.e. no longer stored. However, as shown at operation 714, the entity IDs and semantic hashes associated with the removed entities are retained. Following operation 714, the method 700 ends.

Figure 8:
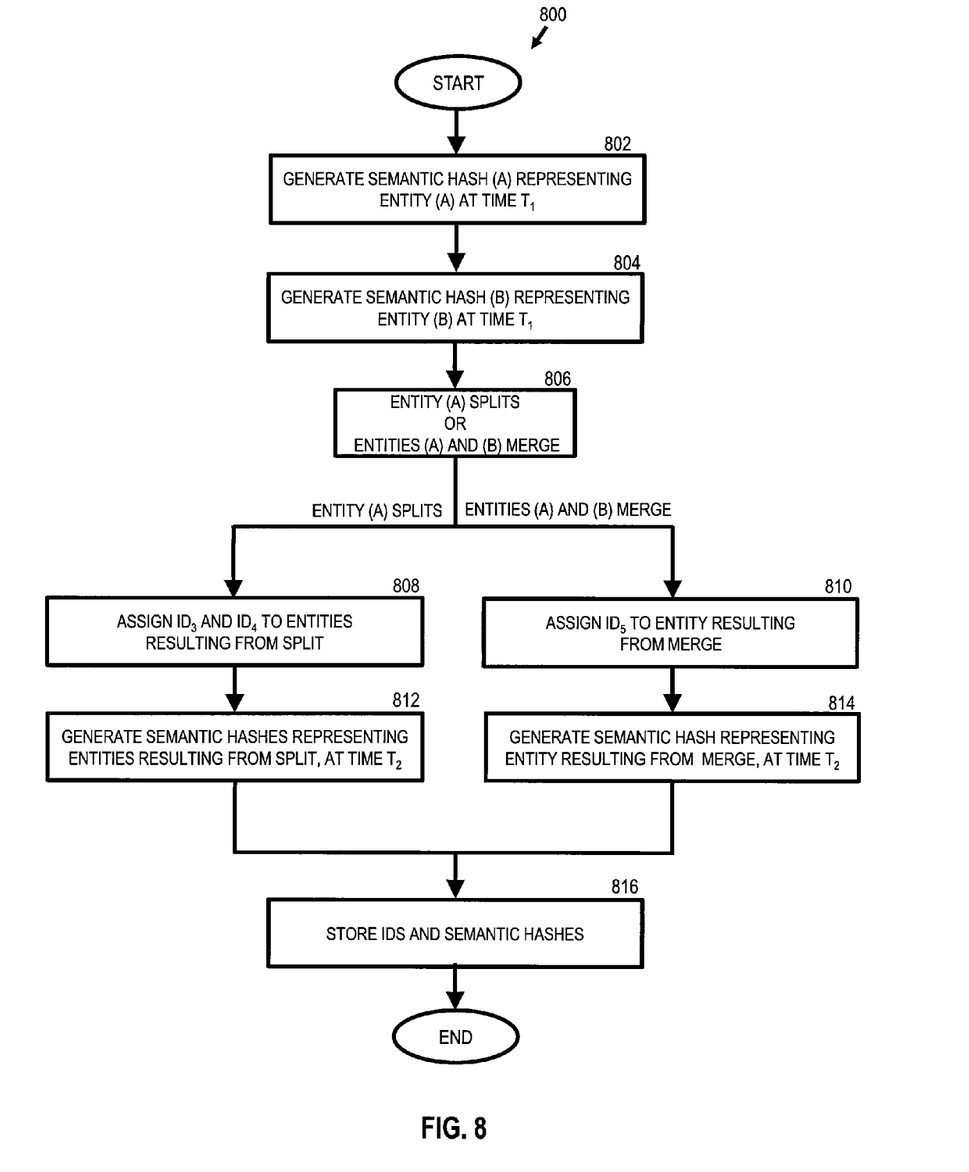
FIG. 8 is a flow diagram illustrating aspects of semantic hashing in entity resolution according to another embodiment.

FIG. 8 is a flow diagram of operations of a method 800 illustrating aspects of semantic hashing in entity resolution, according to another embodiment. The method 800 begins at operation 802, where a semantic hash (A) is generated to represent an entity (A), having a respective assigned entity ID ("$ID_1$") at a point in time $t_1$. As shown at operation 804, a semantic hash (B) is also generated to represent an entity (B) having a respective assigned entity ID ("$ID_2$") at time $t_1$. Following operation 804, a milestone event occurs (806). As shown, the entity milestone can correspond to a split of entity (A) into multiple entities due to, for example, concepts or attributes associated with entity (A) being recognized as referring to multiple distinct entities. The entity milestone can alternatively correspond to a merge of entity (A) and entity (B) due to, for example, a recognition that both entity (A) and entity (B) are associated with concepts or attributes that correspond to a common single entity rather than two distinct entities.

If the entity milestone corresponds to a split of entity (A), then the method 800 proceeds to operation 808, where new entity IDs, "$ID_3$," and "$ID_4$" are assigned to the entities that result from the split. At operation 812, semantic hashes are generated to represent the respective entities resulting from the split at time $t_2$. As such, these semantic hashes are generated at a time that is later than time $t_1$. That is, a period of time has elapsed between the generation of semantic hash (A) and the generation of the semantic hashes representing the entities resulting from the split. Following operation 812, the method 800 proceeds to 816, where the entity IDs and respective semantic hashes are stored for purposes that include, for example, maintaining history information. The method 800 then ends.

If the entity milestone corresponds to a merge of entity (A) and entity (B), then the method 800 proceeds to operation 810, where a new entity ID is assigned to the entity resulting from the merge. At operation 814, a semantic hash is generated to represent the entity resulting from the merge, at time $t_2$. As such, the semantic hash representing the resulting, merged entity is generated at a point in time that is later than the point in time at which semantic hash (A) and semantic hash (B) were generated. That is, a period of time has elapsed between the generation of semantic hash (A) and the generation of the semantic hashes representing entities (A) and (B) and the generation of the semantic hash representing the resulting merged entity. Following operation 814, the method 800 proceeds to 816, where the entity IDs and respective semantic hashes are stored for purposes that include, for example, maintaining history information. The method 800 then ends.

Figure 9:
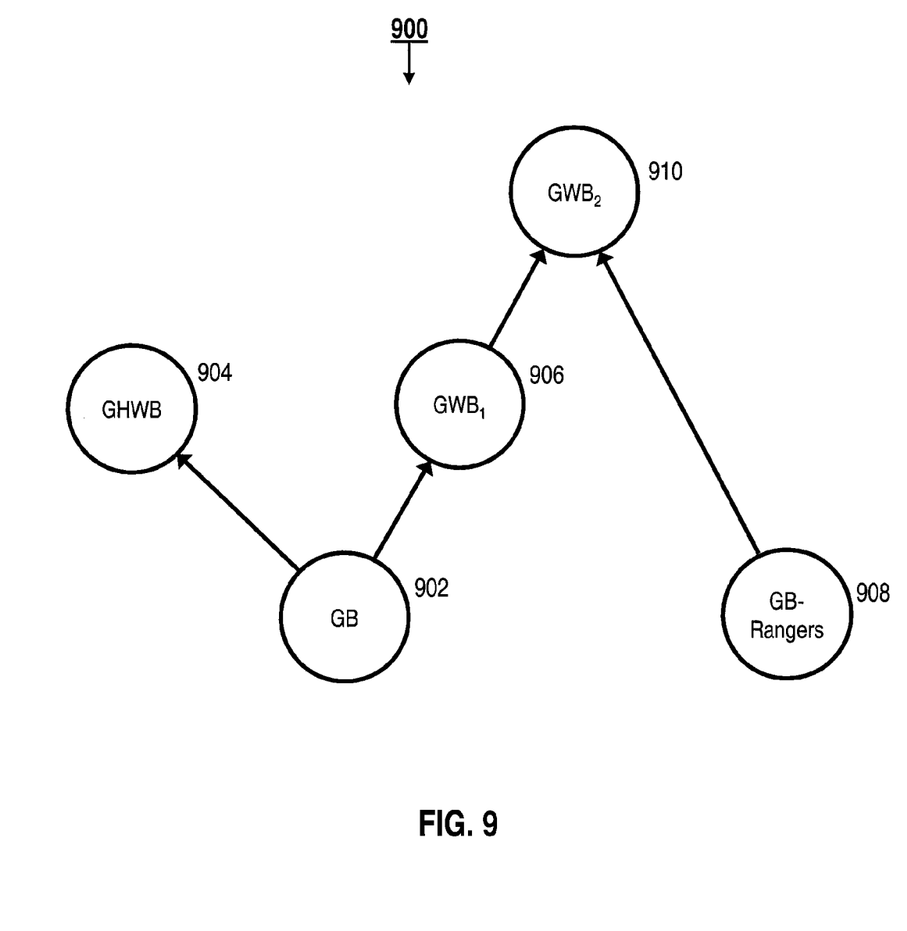
FIG. 9 is a diagram illustrating an exemplary application of aspects of semantic hashing in entity resolution according to embodiments presented herein.

FIG. 9 is a diagram illustrating an exemplary application of aspects relating to semantic hashing in entity resolution according to one or more embodiments presented herein. More particularly, in FIG. 9, aspects of semantic hashing in entity resolution are shown in an exemplary directed acyclic graph (DAG) 900, where each edge denotes the death of an entity ID and the corresponding birth of another entity ID. The DAG 900 can allow one to trace the ID associated with an entity at a particular point in time back to the one or more entities that originated from the entity that it referred to. Each node in the DAG 900 corresponds to a distinct entity ID even though the entity monikers may overlap. As illustrated, the "GB" entity at node 902 has been identified as referring to two distinct individuals, namely "GHWB" and "GWB", and split accordingly to form "GHWB" at node 904 and "GWB$_1$" at node 906. Subsequently, the distinct "GWB$_1$" and "GB-Rangers" entities at respective nodes 906 and 908 are identified as referring to the same individual and are merged to form "CWB$_2$" at node 910. According to one embodiment, a search against the ID associated with the "GB" node 902 would produce results for the entities identified by the nodes 904 and 906 ("GHWB" and "GWB$_1$," respectively).

Although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method comprising:
computing a semantic hash for an entity having an entity identifier (ID);
upon the occurrence of an entity milestone, changing the entity ID;
computing a semantic hash for the entity having the changed entity ID;
maintaining history information comprising entity IDs and semantic hashes associated with the entity over a period of time that includes a plurality of entity milestones; and
periodically removing at least one set of older entities and retaining entity IDs and semantic hashes associated with the removed entities.

2. The computer-implemented method of claim 1, wherein an event milestone comprises a merge of a plurality of entities into a single entity corresponding to the same real-world individual.

3. The computer-implemented method of claim 1, wherein an event milestone comprises a split of an entity into a plurality of entities corresponding to multiple real-world individuals.

4. The computer-implemented method of claim 1, wherein an event milestone comprises removal of entities from a coreference set.

5. The computer-implemented method of claim 1, wherein each of the semantic hashes comprises high confidence information associated with attributes of the entity.

6. The computer-implemented method of claim 5, wherein the high confidence information comprises at least one of biographical information, distribution information associated with mention text, co-location information, assertion information, and temporal information.

7. The computer-implemented method of claim 1, further comprising maintaining a search structure for performing an entity similarity search across the semantic hashes.

8. The computer-implemented method of claim 7, wherein the search structure is configured to enable a nearest neighbor search to be performed across semantic hashes associated with the entity IDs.

9. A computing system comprising:
a processing unit;
a memory operatively coupled to the processing unit; and
a program module which executes in the processing unit from the memory and which, when executed by the processing unit, causes a computer to perform functions comprising:
computing a semantic hash for at least one entity having a respective at least one entity identifier (ID);
upon the occurrence of an entity milestone, changing the at least one entity ID;
computing a semantic hash for the at least one entity having the changed at least one entity ID;
maintaining history information comprising entity IDs and semantic hashes associated with the at least one entity over a period of time that includes a plurality of entity milestones; and
periodically removing at least one set of older entities and retaining entity IDs and semantic hashes associated with the removed entities.

10. The computing system of claim 9, wherein an event milestone comprises at least one of:
a merge of a plurality of entities into a single entity corresponding to the same real-world individual;
a split of an entity into a plurality of entities corresponding to multiple real-world individuals; and
removal of entities from a coreference set.

11. The computing system of claim 9, wherein each of the semantic hashes comprises high confidence information associated with attributes of the at least one entity.

12. The computing system of claim 10, wherein the high confidence information comprises at least one of biographical information, distribution information associated with mention text, co-location information, assertion information, and temporal information.

13. The computing system of claim 9, wherein the functions further comprise maintaining a search structure for performing an entity similarity search across the semantic hashes.

14. The computing system of claim 13, wherein the search structure is configured to enable a nearest neighbor search to be performed across semantic hashes associated with the entity IDs.

15. A computer-readable storage medium having computer-executable instructions stored thereon which, when executed by a computer, cause the computer to perform functions comprising:
    computing a semantic hash for at least one entity having a respective at least one entity identifier (ID);
    upon the occurrence of an entity milestone, changing the at least one entity ID;
    computing a semantic hash for the at least one entity having the changed at least one entity ID;
    maintaining history information comprising entity IDs and semantic hashes associated with the at least one entity over a period of time that includes a plurality of entity milestones; and
    periodically removing at least one set of older entities and retaining entity IDs and semantic hashes associated with the removed entities.

16. The computer-readable storage medium of claim 15, wherein an event milestone comprises at least one of:
    a merge of a plurality of entities into a single entity corresponding to the same real-world individual;
    a split of an entity into a plurality of entities corresponding to multiple real-world individuals; and
    removal of entities from a coreference set.

17. The computer-readable storage medium of claim 15, wherein each of the semantic hashes comprises high confidence information associated with attributes of the at least one entity.

18. The computer-readable storage medium of claim 17, wherein the high confidence information comprises at least one of biographical information, distribution information associated with mention text, co-location information, assertion information, and temporal information.

19. The computer-readable storage medium of claim 15, wherein the functions further comprise maintaining a search structure for performing an entity similarity search across the semantic hashes.

20. The computer-readable storage medium of claim 19, wherein the search structure is configured to enable a nearest neighbor search to be performed across semantic hashes associated with the entity IDs.

\* \* \* \* \*